(12) United States Patent
Kaufman et al.

(10) Patent No.: US 8,205,004 B1
(45) Date of Patent: Jun. 19, 2012

(54) MULTI-BIT-RATE STREAMING DELIVERY

(75) Inventors: Matthew Kaufman, Bonny Doon, CA (US); Andrew Barnert, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 249 days.

(21) Appl. No.: 12/493,121

(22) Filed: Jun. 26, 2009

(51) Int. Cl.
*G06F 15/16* (2006.01)

(52) U.S. Cl. ........................ 709/231; 375/240

(58) Field of Classification Search ................ 709/231, 709/233, 232; 715/716; 375/240
See application file for complete search history.

(56) References Cited

U.S. PATENT DOCUMENTS

| | | | |
|---|---|---|---|
| 5,751,968 | A | 5/1998 | Cohen |
| 6,938,047 | B2 | 8/2005 | Kryeziu |
| 7,400,764 | B2 | 7/2008 | Kryeziu |
| 7,496,676 | B2 | 2/2009 | Kryeziu |
| 7,783,773 | B2 * | 8/2010 | Wu et al. ............ 709/231 |
| 7,925,774 | B2 * | 4/2011 | Zhang et al. ......... 709/231 |
| 2003/0061369 | A1 | 3/2003 | Aksu et al. |
| 2005/0102371 | A1 | 5/2005 | Aksu |
| 2007/0162611 | A1 * | 7/2007 | Yu et al. ............. 709/232 |
| 2008/0195743 | A1 * | 8/2008 | Brueck et al. ....... 709/231 |
| 2008/0276173 | A1 * | 11/2008 | Li et al. ............... 715/716 |
| 2009/0125636 | A1 * | 5/2009 | Li et al. ............... 709/231 |
| 2009/0282162 | A1 * | 11/2009 | Mehrotra et al. .... 709/233 |
| 2010/0161825 | A1 * | 6/2010 | Ronca et al. ......... 709/231 |

FOREIGN PATENT DOCUMENTS
WO WO 2006/138432 12/2006

OTHER PUBLICATIONS

Bill Birney, "Intelligent Streaming," Microsoft Corporation, May 2003, retrieved from internet: http://www.microsoft.com/windows/windowsmedia/howto/articles/intstreaming.aspx?pf=true, 7 pages.
"Move Networks Solutions," Move Networks, Inc., retrieved from internet on Aug. 29, 2008: http://www.movenetworks.com/why-move/solutions, 4 pages.
"Move Media Player," Move Networks, Inc., retrieved from internet on Aug. 29, 2008: http://www.movenetworks.com/wp-content/uploads/move-media-player.pdf, 3 pages.
"Move Adaptive Stream," Move Networks, Inc., retrieved from internet on Aug. 29, 2008: http://www.movenetworks.com/wp-content/uploads/move-adaptive-stream.pdf, 4 pages.
"Our Clients," Move Networks, Inc., retrieved from internet on Aug. 29, 2008: http://www.movenetworks.com/why-move/our-clients, 3 pages.
U.S. Appl. No. 12/201,952, filed Aug. 29, 2008, Kappor et al.

* cited by examiner

*Primary Examiner* — Dustin Nguyen
(74) *Attorney, Agent, or Firm* — Fish & Richardson P.C.

(57) ABSTRACT

Methods, systems, and apparatus, including computer programs encoded on a computer storage medium, relating to single-file multi-bit-rate streaming delivery are described. Media data can be encoded into a single file (or very small number of files), which can then be placed on an unmodified Hypertext Transfer Protocol (HTTP) server. Further, the techniques disclosed here can use HTTP for distribution of the encoded media file and may support multi-bit-rate playback at a client without requiring a modification or plug-in to the server software. Furthermore, these techniques use properties of HTTP and Transmission Control Protocol (TCP) to minimize playback startup time.

22 Claims, 4 Drawing Sheets

MULTI-BIT-RATE STREAMING DELIVERY

BACKGROUND

This specification relates to single-file multi-bit-rate streaming delivery. Some techniques for delivering (either pre-recorded or near-live) media files using Hypertext Transfer Protocol (HTTP) servers and content distribution networks based on HTTP provide a single bit-rate stream. Further, most progressive-playback HTTP video playback clients are configured to use a one-file-one-bit-rate approach.

When playing a single bit-rate stream, a client may receive less data than the bandwidth available to the client (in which case a better experience could be provided if there was a higher source bit-rate). Further, when playing a single bit-rate stream, the client may receive too much data (in which case playback necessarily gets farther and farther behind by pausing the media and allowing the stream to catch up).

SUMMARY

This specification describes technologies relating to single-file multi-bit-rate streaming delivery.

One aspect of the subject matter described in this specification can be implemented in methods that include the actions of receiving, from a media streaming provider via a communication channel, data regarding a media document. The received data can include a media data segment of the media document, and a portion of an index for the media document. The index portion can include information relating to fewer than all segments of the media document. While the received data is being output for playing on an output device, a segment can be selected from the fewer than all the segments of the media document. The selection is based on the information in the index portion, and on a supportable streaming bit-rate via the communication channel. The supportable streaming bit-rate via the communication channel corresponds to an instant streaming bit-rate inferred from Transmission Control Protocol (TCP) information by a client receiving the media data segment. The method can further include requesting the selected segment of the media document from the media streaming provider. Other implementations of this aspect include corresponding systems, apparatus, and computer programs, configured to perform the actions of the methods, encoded on computer storage devices.

These and other implementations can include one or more of the following features. Requesting the selected segment of the media document via the communication channel can include specifying a locator of the media document, a byte-offset to indicate a beginning of the selected segment, and a byte-offset to indicate an ending of the selected segment. The media data segment can contain the index portion.

In some implementations, the fewer than all segments of the media document include a first set of segments. The first set of segments can include, respectively, media portions succeeding the portion of the media being output for playing. Each succeeding media portion may be encoded at each of multiple bit-rates. If an encoding bit-rate of the data being output for playing on the output device is less than the supportable streaming bit-rate via the communication channel then, selecting the segment can include identifying the selected segment from the first set of segments. The identified segment may be encoded at one of the multiple bit-rates larger than or equal to the encoding bit-rate of the data being output for playing on the output device, and smaller than the supportable streaming bit-rate via the communication channel. If the encoding bit-rate of the data being output for playing on the output device is larger than or equal to the supportable streaming bit-rate via the communication channel then, selecting the segment can include identifying the selected segment from the first set of segments. The identified segment may be encoded at one of the multiple bit-rates smaller than the supportable streaming bit-rate via the communication channel.

In other implementations, the fewer than all segments of the media document can also include a second set of segments. The second set of segments can contain, respectively, predetermined media locations of the media document. The predetermined media locations can contain byte-offsets spaced to divide the media into parts having equal duration. The predetermined media locations can correspond to media portions encoded at a lowest bit-rate from the multiple bit-rates. Selecting the segment can include identifying the selected segment from the second set of segments. The identified segment from the second set of segments can succeed the received media data segment. Further, the identified segment from the second set of segments can precede the received media data segment.

According to another aspect, the described subject matter can also be implemented in a system for streaming media to a remote media play point via a communication channel. The system includes a storage device configured to store a media document. The media document can include segments of the media document. Each segment can include a media portion of the media document. The media portion can be encoded at a bit-rate selected from a first set of different bit-rates. Each segment can also include a portion of an index for the media document. The index portion can contain information relating to fewer than all segments of the media document. The information can include byte-offsets corresponding to the fewer than all segments of the media document. The system also includes a processor communicatively coupled to the storage device. The processor is configured to receive, from the remote media play point, a request for a segment of the media document. The request can include a locator of the media document, a byte-offset to indicate a beginning of the requested segment, and a byte-offset to indicate an ending of the requested segment. The processor is also configured to provide the requested segment of the media document to the remote media play point.

These and other implementations can include one or more of the following features. The first set of different bit-rates includes a first bit-rate smaller than a ratio between (i) a fraction of a TCP-initial-burst payload and (ii) a network round-trip time. The media portion included in the provided segment can be encoded at the first bit-rate. A combination of the fraction of the TCP-initial-burst payload and the first bit-rate may be selected based on media content to enable uninterrupted playback between consecutive requests at the remote media play point.

In some implementations, each media portion can be encoded at each of the bit-rates from the first set of different bit-rates. The segments of the media document that contain the media portion encoded at each of the bit-rates from the first set of different bit-rates, respectively, can be interleaved in a file. In other implementations, the segments of the media document that contain the media portion encoded at each of the bit-rates from the first set of different bit-rates, respectively, can be stored in separate files corresponding to the first set of different bit-rates, respectively.

In other implementations, the fewer than all segments of the media document can include a second set of segments. The second set of segments may include, respectively, media portions succeeding the portion of the media. Each succeeding media portion may be encoded at each of the bit-rates from the first set of different bit-rates. The fewer than all segments of the media document can further include a third set of segments associated, respectively, with predetermined media locations of the media document. Each segment from the third set of segments can include a media portion encoded at the lowest bit-rate from the first set of different bit-rates.

The predetermined media locations may be associated with publisher switch points. The predetermined media locations include byte-offsets spaced to divide the media into parts having equal duration. The byte-offsets included in an index portion associated with the first segment of the media document can have the largest spacing. The spacing may be reduced incrementally in subsequent segments before reaching a smallest spacing equal to a duration of the media portion included in each segment. The predetermined media locations of the media document may be selectively associated to preceding segments of the media document. The index portion can include (i) a predetermined byte-offset and (ii) a predetermined byte-range within the segment of the media document.

Particular implementations of the subject matter described in this specification can be implemented so as to realize one or more of the following potential advantages.

The techniques and systems disclosed in this specification can encode media into a single file (or a very small number of files), which can then be placed on an unmodified HTTP server. Because the disclosed techniques and systems can use one or a few media files, the file system of the HTTP server does not need to manage a large numbers of small files, grouped nearby in the file system hierarchy. Further, because the disclosed techniques and systems can use one or a few media files, HTTP cache-servers correspondingly need store only one or a few files in each cache, therefore simplifying the post-stream cleanup. The techniques and systems described in this specification can also improve the ability of unmodified HTTP cache servers to pre-fetch content while being compatible with algorithms and settings existing on the unmodified HTTP cache servers for pre-fetching other content.

Furthermore, the techniques disclosed here can use HTTP for distribution of the encoded media file and may support multi-bit-rate playback at a client without requiring a modification or plug-in to the software of the HTTP server or the HTTP cache-server. Also, in the disclosed techniques and systems no initial manifest file or index need be sent to the playback client as no interoperability with a server plug-in is required. By avoiding an initial download of such a manifest or index, the start of media playback can be sped up significantly.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The techniques and systems disclosed in this specification can encode media into a single file (or a small number of files), which can then be placed on an unmodified Hypertext Transfer Protocol (HTTP) server. Further, the techniques disclosed here can use HTTP for distribution of the encoded media file and may support multi-bit-rate playback at a client without requiring a modification or plug-in to the server software. Furthermore, these techniques can use properties of HTTP and Transmission Control Protocol (TCP) to minimize playback startup time.

The techniques and systems disclosed in this specification can be implemented in the ADOBE® FLASH® Player and ADOBE® AIR® software (available from Adobe Systems Incorporated, of San Jose, Calif.) for potentially improved HTTP video delivery. In some implementations, the techniques described in this specification can enable the ADOBE® FLASH® Media Server (also available from Adobe Systems Incorporated, of San Jose, Calif.) to use HTTP as an alternative delivery vehicle for streaming video.

Figure 1:
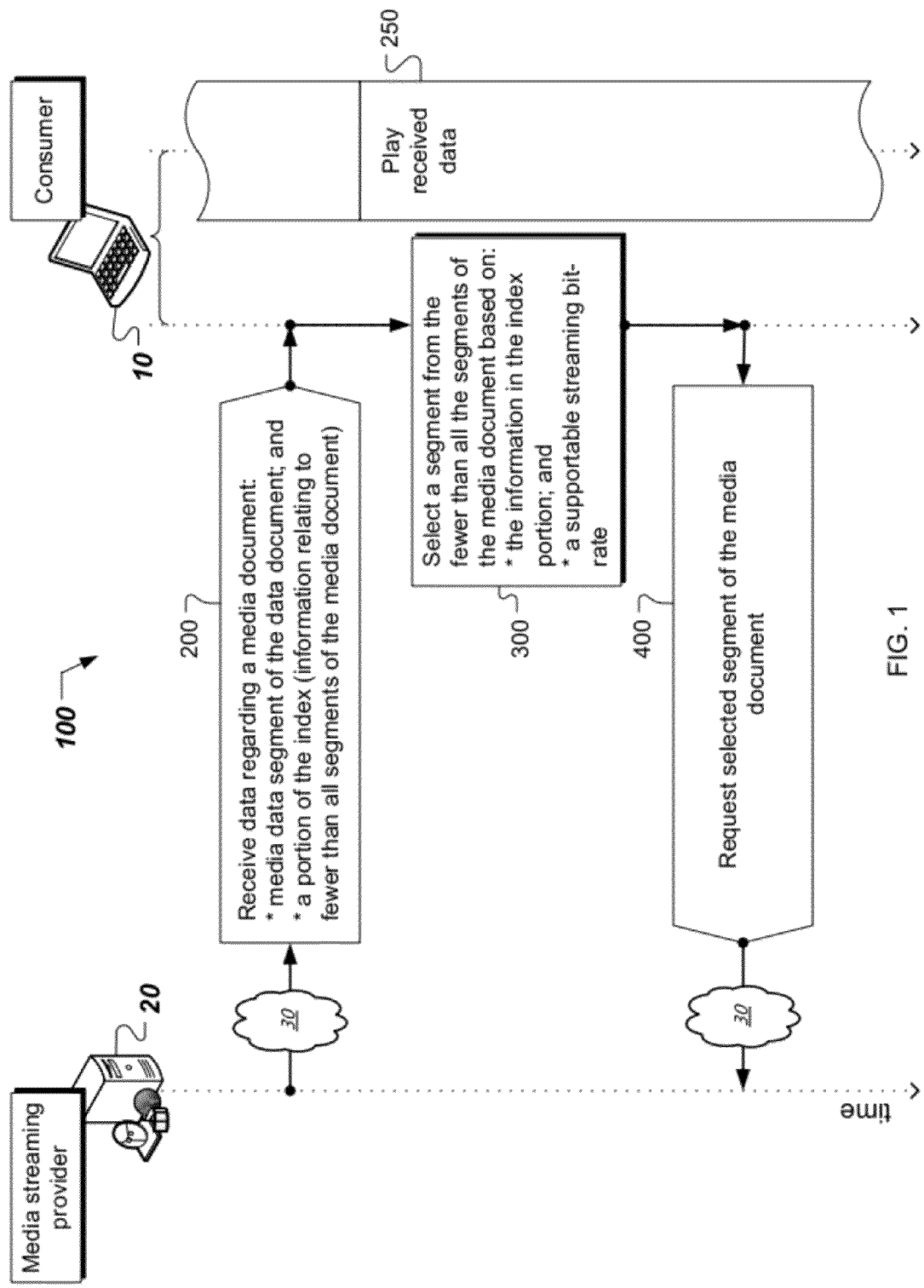
FIG. 1 shows block diagram of an example system and technique for multi-bit rate streaming delivery.

FIG. 1 shows a block diagram of an example system and technique for multi-bit rate streaming delivery. A communication system 100 includes a consumer 10 communicatively coupled to a media streaming provider 20 via a communication channel 30. In some implementations, the communication channel 30 may be implemented via the internet. In other implementations, the communication channel 30 may be implemented via a private communication network. The communication protocol over the communication channel 30 may be TCP.

The consumer 10 can be identified as a client 10 and necessarily includes some hardware since the consumer 10 includes a computerized electronic device 10. The computerized electronic device 10 may be a laptop computer, a media player device, a mobile device, etc. The computerized electronic device 10 includes a processor and may also include a storage device. The processor may be configured to request and receive a media stream from the media streaming provider 20. Further, the computerized electronic device 10 includes an output device for playing the received media.

The media streaming provider 20 can be identified as a server 20 and necessarily includes some hardware since the media streaming provider 20 may include at least a computer workstation 20. The components of the media streaming provider 20 are described in detail with reference to FIG. 2A.

Returning to FIG. 1, the media streaming provider 20 represents an unmodified HTTP server. The consumer 10 may use an HTTP-byte-range request for requesting segments of a media document that can be stored on the HTTP server of the media streaming provider 20. Notably, an unmodified HTTP server can respond to the HTTP-byte-range requests received from the subscriber 10. The media document can be identified as an electronic document which may, but need not, correspond to a file. Likewise, the media document can, but need not, be identified as an HTTP resource having a corresponding Uniform Resource Locator (URL). Furthermore, a file may, but need not, be associated to an HTTP resource.

An electronic document may be stored in a portion of a file that holds other documents, in a single file dedicated to the document in question, or in multiple coordinated files. As segments of the media document are being played by the consumer 10, a client processor can calculate whether an increase or decrease in bit-rate may be warranted, and can select which media segments are to be fetched next. In order to accurately request the selected media segments from an unmodified HTTP server at the media streaming provider 20, the client 10 can use index information to translate from the selected segment number (equivalent to time offset) and the selected encoding bit-rate to a start and end byte offset (and, in the case of multiple files, the locator of the file containing that segment). The media document and the associated index are described in detail with reference to FIG. 2B.

An example of a technique to accomplish HTTP-based adaptive-bit-rate media streaming is now described in connection with FIG. 1. The technique can receive 200, from the media streaming provider 20 via the communication channel 30, data regarding a media document. The received data may include a media data segment of the media document, and a portion of an index for the media document. In some implementations, the media data segment includes the index portion. The index portion can contain information relating to fewer than all segments of the media document. By not sending the entire index associated with the media document to the client 10 prior to starting media playback, the client 10 may avoid a delay in starting the media playback. Further, not all information included in the entire index may be needed at the client 10. Also, sending index portions that relate to fewer than all segments of the media document can be advantageous for near-live streaming, when index information may not exist for times that have not yet occurred and have not yet been encoded.

While the received data may be output for playing 250 on an output device at the consumer 10, the technique can select 300 a segment from the fewer than all the segments of the media document (referenced in the received index portion) for subsequent playing. The selection 300 may be based on the information in the index portion. If the index portion includes information about the following media segments, the technique may automatically select 300 the following media segments as part of progressive (forward) media playing. If the index portion includes information about predetermined locations of the media, the technique may select 300 a random media location as part of media seeking Further, the selection 300 may be based on a combination of information included in the received index portion and a supportable streaming bit-rate via the communication channel 30. In this specification, the supportable streaming bit-rate via the communication channel 30 corresponds to an instant streaming bit-rate inferred (from TCP information) by the client 10 receiving 200 the media data segment, for example. The streaming bit-rate supportable via the communication channel 30, as experienced by the client 10, may vary in time, and may depend on the client's 10 network activity, on the media streaming provider's 20 network activity and on the overall network 30 activity. Once the processor at the client 10 infers the instant streaming bit-rate supportable via the communication channel 30, the selection 300 can proceed to identify a subsequent media segment encoded at a bit-rate that can provide uninterrupted transmission and high resolution playing. The details of the selection 300 are described in detail with reference to FIG. 3.

In some implementations, the selection 300 may be based on a determination that the processing capacity of the client processor becomes insufficient to decode media encoded at the bit-rate of the data being output for playing on the output device. In such implementations, the selection 300 can identify a subsequent media segment encoded at a bit-rate smaller than the encoding bit-rate of the data being output for playing on the output device, even if the encoding bit-rate of the data being output for playing on the output device is less than the supportable streaming bit-rate via the communication channel 30.

The technique can then request 400 the selected segment of the media document from the media streaming provider 20. In some implementations, requesting 400 the selected segment of the media document via a communication channel 30 based on HTTP can include specifying a locator of the media document, a byte-offset to indicate the beginning of the selected segment, and a byte-offset to indicate the ending of the selected segment.

Figure 2A:
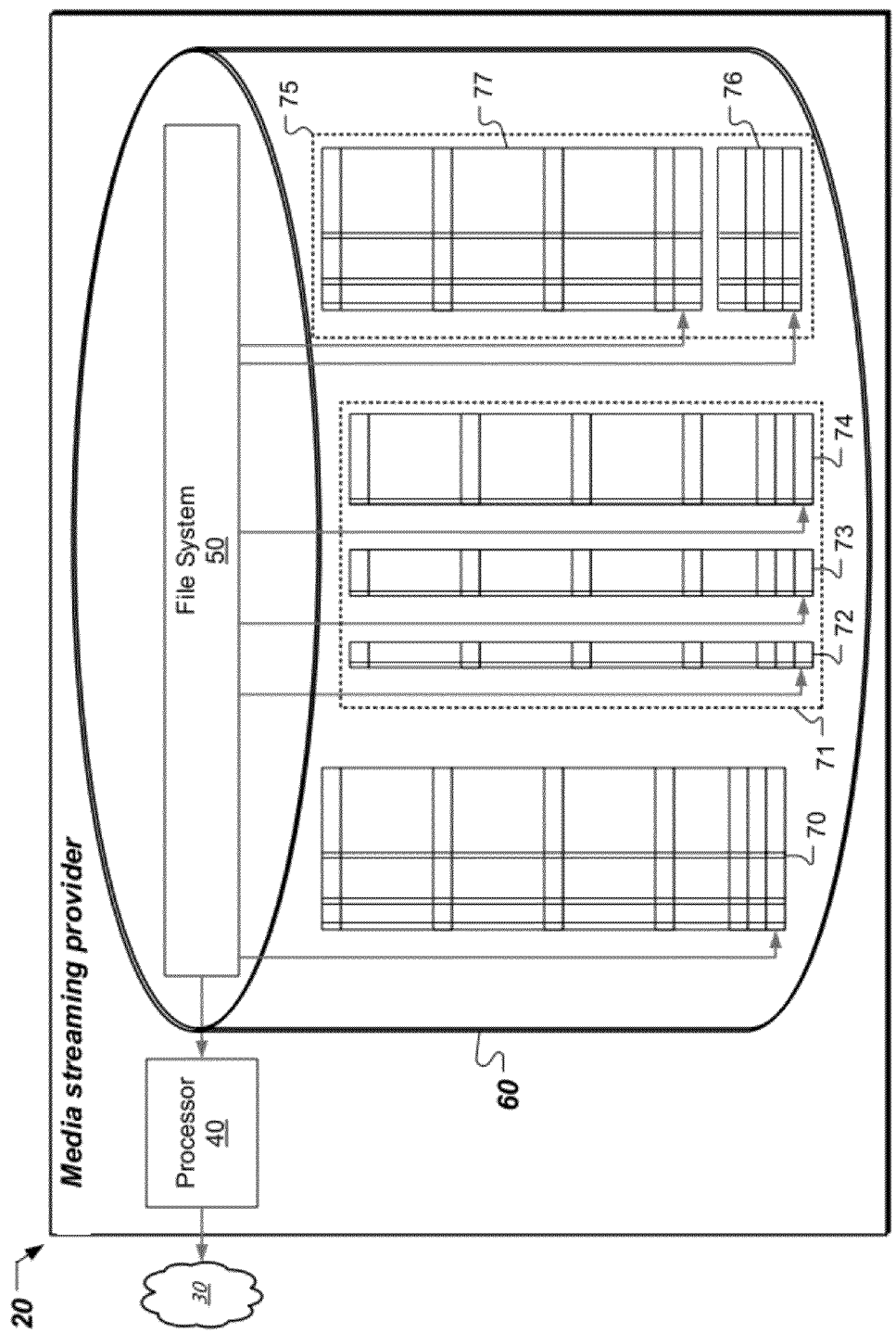
FIG. 2A shows a block diagram of an example media streaming provider system for multi-bit rate streaming delivery.

FIG. 2A shows a block diagram of an example media streaming provider system 20 for multi-bit-rate streaming delivery. The system for media streaming 20 is communicatively coupled to a remote media play point 10 via a communication channel 30. The media streaming provider 20 includes a processor 40 communicatively coupled to a store 60. The store 60 may be a storage device, for example a hard drive or a flash card. The store can be further identified as a database 60 integrated into a file system 50. The database 60 can be configured to store media documents 70, 71 and 75. Segments of each of the media documents 70, 71 and 75 may be accessed based on indexing schemes described below.

Each segment of a media document may include a media portion of the respective media document. In this specification, the media portion is also referred to interchangeably as the media data segment, or the media segment. The media portion can be encoded at a bit-rate selected from multiple bit-rates. Furthermore, each segment of the media document may include a portion of an index for the media document. The index portion contains information relating to fewer than all segments of the media document. The information contained in the index portion includes byte-offsets corresponding to the fewer than all segments of the media document.

In some implementations, the media document 70 can be encoded into a single file. In such implementations, segments of the media document that include media portions encoded at each of the multiple bit-rates, respectively, may be interleaved in the single file.

In other implementations, the media document 71 can contain a small number of files, 72-74, and each file may correspond to a (different) encoding bit-rate. For example, a recorded one-hour show can be encoded at a low bit-rate in file 72, at an intermediate bit-rate in file 73, at a high bit-rate in file 74.

In yet other implementations, the media document 75 can contain a small number of files, 76 and 77. For example, a first file 76 may correspond to the initial 6 minutes of a recorded one-hour show, while the second file 77 may correspond to the remaining 54 minutes of the recorded one-hour show. Further, each media portion of files 76 and 77 can be encoded at each of the multiple bit-rates. In some aspects of this implementation, there can be two files for each encoding bit-rate. A first file 76 may include the first 6 minutes of the recorded one-hour show encoded at a given bit-rate. A second file 77 may include the remaining 54 minutes of the recorded one-hour show encoded at the same bit-rate.

Each file 70, 72-74, 76 and 77 can include both audio and video and index information. Each file 70, 72-74, 76 and 77 can also contain other kinds of media data, e.g., subtitle text, smell-o-vision, and non-index metadata, e.g., cross-references to entries of internet-based movie databases, current scores of related matches during a sporting event, and more.

The processor 40 of the system for streaming media 20 may be configured to receive, from the remote media play point 10, a request for a segment of the media document. The request can include a locator of the media document, a byte-offset to indicate a beginning of the requested segment, and a byte-offset to indicate an ending of the requested segment. The characteristics of the foregoing request may describe an HTTP request. Further, the processor 40 may be configured to provide the requested segment of the media document to the remote media play point 10.

Figure 2B:
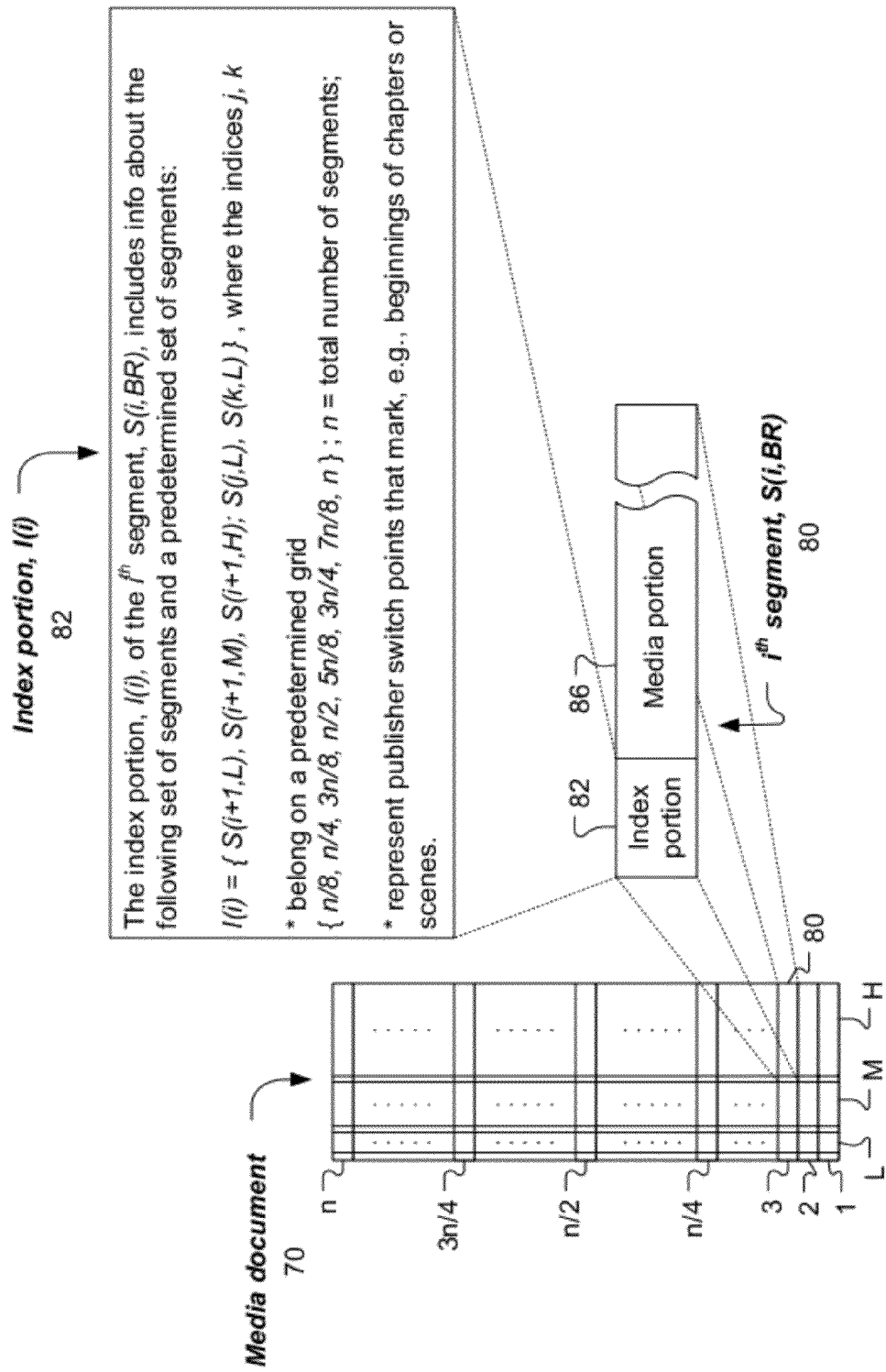
FIG. 2B shows a schematic of an example media document including an index interleaved in the media document.

FIG. 2B shows a schematic of an example media document 70 including index information interleaved in the media document 70. In such implementations, an index for the media document 70 may be arranged in a prioritized (partially hierarchical) order, and may be distributed throughout the media document 70 based on that order, as described below. The media document 70 can include segments of the media document, S(i, BR) 80. Each segment of the media document, S(i, BR) 80, includes an index portion, I(i) 82, and a media portion, MP(i, BR) 86. The segment number "i" may be associated to a time offset for the media portion, MP(i, BR) 86, included in the segment of the media document, S(i, BR)

80. For example, there may be n time offsets in media included in the media document 70.

The encoding bit-rate, BR, of a media portion 86 can be one of the multiple encoding bit-rates described above. For example, each media portion 86 may be encoded at a low (L) bit-rate, a medium (M) bit-rate and a high (H) bit-rate. An example of a low bit-rate for video encoding is 100 kbps. An example of a medium bit-rate for video encoding is 250 kbps. Examples of high bit-rates for video encoding are 1 Mbps and 3 Mbps. The set of multiple encoding bit-rates illustrated in FIG. 2B is just an example set. The set of multiple encoding bit-rates can include anywhere from two encoding bit-rates to a very large number of encoding bit-rates (e.g., a set of multiple encoding bit-rates containing 12 possible bit-rates is described in an example implementation below.)

The index portion, I(i) 82, included in a segment of the media document, S(i, BR) 80, may include information about a first set of segments, fewer than all segments of the media document 70. The segments in the first set of segments include, respectively, media portions succeeding the media portion, MP(i, BR) 86, each succeeding media portion encoded at each of the multiple bit-rates. In the implementation illustrated in FIG. 2B, the index portion, I(i) 82, corresponding to the segment of the media document, S(i, BR) 80, includes information about segments that include the immediately following (consecutive) media portion, MP(i+1, BR'), encoded at all three available bit-rates, BR' in {L, M, H}: S(i+1, L), S(i+1, M) and S(i+1, H).

In other implementations, there may be more than three available encoding bit-rates (L, M, H} for encoding the media portion, MP(I, BR) 86. For example, there may be 12 encoding bit-rates, BR in {BR1, BR2, . . . , BR12}. In this example, the index portion, I(i) 82, corresponding to the segment of the media document, S(i, BR5), references segments that include the immediately following (consecutive) media portion, MP(i+1, BR'), where BR' includes some, but not all of, the 12 encoding bit-rates. For instance, the segments encoded at the same or next-smaller/larger bit-rates, S(i+1, BR4), S(i+1, BR5) and S(i+1, BR6), may be referenced in the index portion of the segment of the media document, S(i, BR5).

In some implementations, information about the first set of segments can provide the ability for the client 10 to switch bit-rates. As described above, the index portion, I(i) 82, (received along with the received media portion, MP(i, BR) 86) may allow the client 10 to select the following media segment 80 at any available encoding bit-rate, S(i+1, L), S(i+1, M) and S(i+1, H), for instance. In other implementations, in order to pipeline the delivery, the index portion 82 may also include the information for the client 10 to select any bit rate of a few additional segments forward. For instance, the received index portion, I(i) 82, may also include information about the second next S(i+2, BR'), third next S(i+3, BR') and fourth next S(i+4, BR') segments, where the encoding bit-rate BR' can be in {L, M, H}.

However, information about segments from the first set of segments may be insufficient for random-access seeking. Thus, the index portion, I(i) 82, included in the segment of the media document, S(i, BR) 80, may also include information about a second set of segments, fewer than all segments of the media document. Segments from the second set of segments may be associated, respectively, with predetermined media locations (points or time offsets) of the media document 70. In some implementations, each segment from the second set of segments includes a media portion 86 encoded at the lowest bit-rate from the multiple bit-rates.

In the example illustrated in FIG. 2B, the index portion, I(i) 82, corresponding to the segment of the media document, S(i, BR) 80, includes information about two segments from the second set of segments: the segment of the media document at point-j, S(j, L), and the segment of the media document at point-k, S(k, L). Further in this example, these two media locations "j" and "k" may belong on a predetermined grid of equally spaced time divisions: {n/8, n/4, 3n/8, n/2, 5n/8, 3n/4, 7n/8, n}, where n is the total number of segments of the media document. Specific implementations of the index portion 82 are being discussed in detail later in this specification.

Note that in this example, the information included in the index portion 82 may be limited to segments from the second set of segments having media portions encoded at the lowest available encoding bit-rate. The foregoing limitation may reduce the amount of index data included in the index portion, I(i) 82, to enable providing a client more media data and less index data. In some implementations, limiting the information in the index portion 82 to segments from the second set of segments encoded at the lowest available bit-rate enables the index portion 82 to reference more predetermined points than if the index portion 82 references segments from the second set of segments encoded at every available bit-rate. In other implementations, the index portion 82 can reference segments from the second set of segments encoded at the lowest available bit-rate and at one other bit-rate.

However, random-access seek information in the hierarchical index provided only for the baseline bit-rate may be adequate because playback is interrupted when randomly seeking. Thus, a client 10 may experience playback of the same quality at the seek-to point as playback during the first segment of the media document, S(1, L). Further, once playback may resume at that seek-to point, the client 10 can receive information to fetch the NEXT segment 80 (just a few seconds later) at a higher bit-rate, if the supportable streaming bit-rate via the communication channel 30 is higher than the available encoding bit-rates.

In other implementations, the predetermined media locations include byte-offsets that can be spaced to divide the media in the media document 70 into portions having gradually shorter duration. In such implementations, the byte-offsets included in an index portion, I(1), associated with the first segment of the media document, S(1, L), can have the longest spacing. For example, the index portion I(1) corresponding to the first segment of the media document S(1, L) may include information about the segment of the media document at the halfway point-n/2, S(n/2, L), and about the last segment of the media document, n, S(n, L). Then, the index portion, I(2), corresponding to the second segment of the media document, S(2, BR), may include information about the segment of the media document at the quarter-way point-n/4, S(n/4, L), and about the segment of the media document at the three-quarter-way point-3n/4, S(3n/4, L). Because not all predetermined media locations can be referenced in a single index portion 82, early random seeking to future media locations may not provide accurate random access to the seek-to media location. However, the spacing of the predetermined points may be reduced incrementally in subsequent segments before reaching a shortest spacing equal to the duration of the media portion 86 included in each segment 80.

Each segment of the media document 80 may include an index portion 82 to provide information for progressive (forward) media playing. The index portion 82 can also be used in the case where the received segment may be the target of a random-access seek. Therefore, the index portion 82 of a received segment 80 may also include finely-grained index information for the region of the media in the vicinity of the received segment of the media document 80. Thus, the client 10 can accumulate enough information in an in-memory index (cumulative index maintained by the client 10) to seek randomly to other segments of the media document. Thus, in case a user seeks to a later point of the media document 70, the user may be able to resume playback at a point roughly equivalent to a requested (seek-to) position. However, as more segments may be received, the cumulative index, maintained by the client 10, can become more and more accurate.

Frame-accurate seeking within a segment of the media document 80 can be performed independently of index information, because byte-locations within the frame can be calculated by examining the individual frame data blocks once the segment 80 is received.

In yet other implementations, additional hierarchical index information regarding the second set of segments may be provided for evenly-spaced future points in time for which space in the first index portion, I(1), may be available, (e.g., the halfway point, the quarter and three-quarter points, the "⅛th", "⅜ths", "⅝ths", and "⅞ths" points and so on,) until space in the first index portion, I(1), may be exhausted.

The second set of segments may also be associated, respectively, with publisher switch points. In some implementations relating to pre-recorded content, the publisher switch points may be chapter points or scene points. Information about the segments of the media document associated with the publisher switch points may also be included in the index portion, I(1), of the first segment of the media document, S(1, L), until space in the first index portion, I(1), may be exhausted, and so on. In the foregoing examples, a segment of the media document identified in the first or second sets of segments may include media that succeeds the received media data segment, MS(i, BR) 86. The set of evenly-spaced points and the set of publisher switch points (illustrated in FIG. 2B) are two among many possible examples of predetermined points that may be part of the second set of segments.

However, a segment identified in the second set of segments may also include media that precedes the received media data segment, MS(i, BR) 86. Because the user may seek to any point at any time, some of the index data in later segments of the media document 80 may replicate the finer-grained detail in the earlier segments (second segment, S(2, BR), third segment, S(3, BR), and so on) so that the in-memory index, maintained by the client 10, may be filled out even if the user immediately seeks to a late point in the media. Further, if the user seeks in such a way that prior index portions 82 become necessary in order to improve seek resolution, the client 10 may choose to download (but not play) these earlier segments 80. In doing so, the client 10 can receive the index portions 82 for the earlier segments 80 and can fill out the in-memory index. Downloading earlier segments 80 may briefly use additional bandwidth and potentially interrupt play. However, when the user is randomly seeking to new points, playback may be already interrupted.

The index portion 82 may include (i) a predetermined byte-offset and (ii) a predetermined byte-range within each segment of the media document. A media document 70 may have an index that can be placed in fixed-size index portions 82 of segments of the media document 80. The fixed-size index portions 82 can be reserved and padded to fit the information relating to fewer than all segments of the media document. Further, the index portion 82 can be placed at either the beginning or the end of a segment of the media document 80. For example, the MPEG4 container format satisfies the foregoing properties. The foregoing format of a media document 70 may allow for the index information to be written late for near-live encoding.

The techniques disclosed in this specification use properties of HTTP over TCP to minimize playback startup time. The media streaming provider 20 can use TCP to initially send a burst of data to the client 10. Then, the media streaming provider 20 stops to wait for a first acknowledgement from the client 10. The waiting time corresponds to one network round-trip time. Various industry standards, for example RFC 3390 and RFC 2581, specify an initial behavior of TCP. For example, the initial burst of data includes 4380 bytes of payload. To enhance the user experience, the media playback may start as quickly as possible. Thus, an initial segment of the media document, S(1, BR1), may encode media data and index information into that first 4380 bytes. The initial (first) media portion, MP(1, BR1), may be encoded at a first bit-rate, BR1, to fit alongside the first index portion, I(1), in the 4380 bytes of payload. Additionally, the initial media portion, MP(1, BR1), may be selected to occupy sufficient playback time such that a request for the next segment of the media document, S(2, BR), can be placed and a second media frame can be received in reply to the request, before the playback time of the initial media portion, MP(1, BR1), expires.

Some media documents may use initial metadata to begin playback. For example, in some digital rights management (DRM) schemes, an amount of metadata much larger than 4380 bytes may be used to begin playback. In such situations, playback may not be able to start based on the first transmitted TCP packet. However, an example DRM scheme presented below can use metadata for beginning playback that can be fit in the initial segment transmitted with the first TCP packet. In this example, the metadata can be divided in small portions and playback of the media document can start with only part of the metadata available. Each of the small portions of metadata may be included in an index portion 82. For example, the DRM scheme described in this specification can be configured to enable lowest-bit-rate media or initial-segment media, or both, to be played without a DRM exchange. In other implementations, an 8-byte frame holding flags and an offset to a later key may be embedded in the segment of the media document, S(1, L), transmitted first. The key may be embedded in the segment of the media document, S(2, BR), transmitted second.

The multiple bit-rates described above with reference to FIGS. 2A and 2B, may include a first bit-rate, BR1, smaller than a ratio between (i) a fraction, f, of a TCP-initial-burst payload and (ii) a network round-trip time. (0<f≦1.)

$$BR1 < \frac{f(TCP\_payload)}{round\_trip\_time}$$

Among other things, the fraction, f, (associated with the TCP payload reduction) depends at least in part on the size of the HTTP header length (also included in the 4380 bytes). The reduction (measured by f) in the total payload is based on the size of the HTTP header length. The media portion, MP(1, BR1), included in the provided segment, S(1, BR1), can be encoded at the first bit-rate, BR1. Further, a combination of the fraction, f, of the TCP-initial-burst payload and the first bit-rate, BR1, may be selected based on media content to enable uninterrupted playback between consecutive requests at the remote media play point 10.

In some implementations the fraction, f, of the TCP-initial-burst payload may be fixed. In such implementations, if the first media portion, MP(1, BR1), may be, for example, a static (action-less) scene, then the initial video portion, MP(1, BR1), can be encoded at a first bit-rate, BR1, that may be high. However, in the same implementations, if the first media portion, MP(1, BR1), may be, for example, a dynamic (action-packed) scene, then the initial video portion, MP(1, BR1), can be encoded at a first bit-rate, BR1, that may be low.

In other implementations the first media portion, MP(1, BR1), may be encoded at only one first bit-rate, BR1. In such implementations, if the first media portion, MP(1, BR1), may be, for example, a static (action-less) scene, then the fraction, f, of the TCP-initial-burst payload containing the first video portion, MP(1, BR1), may be low, thus providing ample data capacity for the first index portion, I(1). However, in the same implementations, if the first media portion, MP(1, BR1), may be, for example, a dynamic (action-packed) scene, then the fraction, f, of the TCP-initial-burst payload containing the first video portion, MP(1, BR1), may be high, thus providing limited data capacity for the first index portion, I(1).

In some other implementations, the fraction, f, of the TCP-initial-burst payload and the first bit-rate, BR1, can also be selected based on an estimate of the size of additional headers that may be added by cache-servers as the TCP-initial-burst packet makes its way from the media streaming provider 20 to the client's output device 10.

Based on the foregoing properties of HTTP over TCP, it may be advantageous to avoid encoding the first 4380 bytes (of data relating to the media document) included in an initial TCP packet with information limited to index or with manifest files. Such index information or manifest files cannot be used to generate decoded video and audio for the client 10.

It was disclosed with reference to FIGS. 2A and 2B that the information contained in the index portion, I(i), of the received segment of the media document, S(i, BR), relating to the fewer than all segment of the media document includes the encoding bit-rates of the fewer than all segment of the media document, respectively. As indicated in connection with FIG. 1, the information about the encoding bit-rates of the fewer than all segments of the media document in combination with the streaming bit-rate supportable via the communication channel 30—inferred while receiving 200 the data regarding the media document—can be used to select 300 a segment from the fewer than all segments of the media document.

Figure 3:
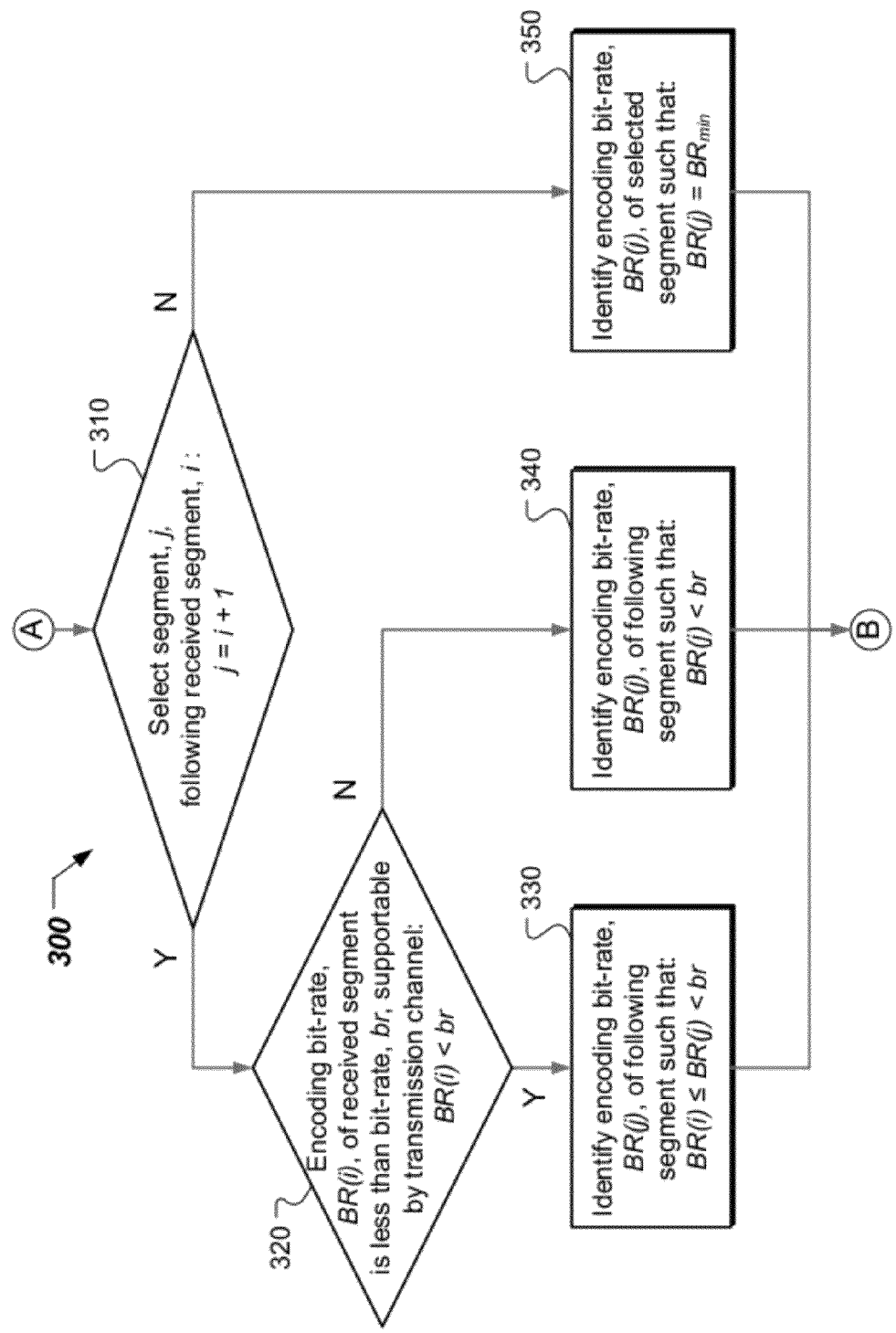
FIG. 3 shows a flow diagram of an example process for selecting multi-bit rate media segments of a media document.

FIG. 3 shows a flow diagram of an example process for selecting 300 multi-bit rate media segments of a media document. The indices "i" and "j" correspond to the previously received and the currently selected segments, respectively. The process can select 310 a segment of the media document, S(j=i+1, BR(j)), following the received segment of the media document, S(i, BR(i)). According to the terms introduced in reference with FIGS. 2A and 2B, the following segment of the media document, S(j=i+1, BR(j)), belongs to the first set of segments. Returning to FIG. 3, the process can alternatively select 310 a segment of the media document, S(j=i+1, BR(j)), not following the received segment of the media document, S(i, BR(i)). According to the terms introduced in reference with FIGS. 2A and 2B, the segment of the media document, S(j=i+1, BR(j)), not following the received segment of the media document, S(i, BR(i)), belongs to the second set of segments, also referred to as the predetermined set of segments.

If the process selects 310 a segment of the media document, S(j=i+1, BR(j)), following the received segment of the media document, S(i, BR(i)), then the process may compare 320 an encoding bit-rate, BR(i), of the data being output for playing on the output device with a supportable streaming bit-rate, br, via the communication channel 30. This comparison 320 may occur during progressive (forward) media playing on the output device at the client 10.

If the encoding bit-rate, BR(i), of the data being output for playing on the output device is less than the supportable streaming bit-rate, br, via the communication channel 30 then, the process identifies 330 the selected segment, S(j=i+1, BR(j)), from the first set of segments, the identified segment, S(j=i+1, BR(j)), encoded at one of the multiple bit-rates, BR(j), larger than or equal to the encoding bit-rate, BR(i), of the data being output for playing on the output device, and smaller than the supportable streaming bit-rate, br, via the communication channel 30.

If the encoding bit-rate, BR(i), of the data being output for playing on the output device is larger than or equal to the supportable streaming bit-rate, br, via the communication channel 30, then the process identifies 340 the selected segment, S(j=i+1, BR(j)), from the first set of segments, the identified segment, S(j=i+1, BR(j)), encoded at one of the multiple bit-rates, BR(j), smaller than the supportable streaming bit-rate, br, via the communication channel 30.

In other implementations, the process can identify the encoding bit-rate, BR(j), of the selected segment, S(j=i+1, BR(j)), from the first set of segments, to be smaller than the encoding bit-rate, BR(i), of the data being output for playing on the output device, even if the encoding bit-rate, BR(i), of the data being output for playing on the output device is less than the supportable streaming bit-rate, br, via the communication channel 30. The foregoing selection may occur if the processing capacity of the client processor becomes insufficient to decode media encoded at the bit-rate, BR(i), of the data being output for playing on the output device.

The process may select 310 a segment of the media document, S(j, BR(j)), not following the received segment of the media document, S(i, BR(i)). In that case, the process identifies 350 the selected segment, S(j, BR(j)), from the second set of segments, the identified segment, S(j, BR(j)=BRmin), at a smallest of the multiple encoding bit-rates, BR(j)=BRmin. The identifying 350 may occur during random seeking on client's output device 10.

In some implementations disclosed above, the index portion 82 regarding the second set of segments can reference media encoded at one or more bit-rates larger than the smallest available encoding bit-rate. In such implementations, if the encoding bit-rate, BR(i), of the data being output for playing on the output device is less than the supportable streaming bit-rate, br, via the communication channel 30, then the process may select a seek-to segment of the media document at the next-smaller encoding bit-rate, BR(i)-1, or even at the same encoding bit-rate, BR(i), for example.

In other implementations, the selection of the encoding bit-rate, BR, of the seek-to segment of the media document can be based on the results of previous seek selections. The selection performed this way can be free from effects caused by, e.g., a local cache during sequential reading. Multiple algorithms that can take past seek selections into account may be applied to select the encoding bit-rate of the seek-to segment of the media document. For example, such algorithms may compute a non-weighted or a weighted running average of encoding bit-rates during previous seek selections.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, from a media streaming provider via a communication channel in response to a first request, a first data item regarding a media document that includes multiple data segments, the received first data item comprising:
    a first media data segment of the media document from among the multiple data segments, the first media data segment comprising a first media portion, and
    a first portion of an index for the media document, the first index portion comprising index information relating to a first set of media data segments, the first set of media data segments comprising
        media data segments from among the multiple data segments of the media document that comprise, respectively, media portions succeeding the first media portion, each of the media portions succeeding the first media portion being encoded at each of multiple bit-rates, and
        media data segments of the media document that correspond, respectively, to predetermined media locations of the media document, each of the media data segments that correspond to the predetermined media locations including an associated media portion encoded at a lowest bit-rate from the multiple bit-rates;
while the received first data item is being output for playing on an output device, selecting a second media data segment from the first set of media data segments of the media document based on:
    the information in the first index portion, and
    a supportable streaming bit-rate via the communication channel;
requesting, in a second request different from the first request, the selected second media data segment of the media document from the media streaming provider; and
receiving, from the media streaming provider via a communication channel in response to the second request, a second data item regarding the media document, the received second data item comprising:
    the selected second media data segment of the media document, the selected second media data segment comprising a second media portion, and
    a second portion of the index for the media document that is different from the first index portion, the second index portion comprising index information relating to a second set of media data segments, the second set of media data segments comprising
        media data segments from among the multiple data segments of the media document that comprise, respectively, media portions succeeding the second media portion, each of the media portions succeeding the second media portion being encoded at each of the multiple bit-rates, and
        media data segments of the media document that correspond, respectively, to the predetermined media locations of the media document, each of the media data segments that correspond to the predetermined media locations including the associated media portion encoded at the lowest bit-rate from the multiple bit-rates.

2. The method of claim 1, wherein requesting the selected second media data segment of the media document via the communication channel comprises:
specifying a locator of the media document, a byte-offset to indicate a beginning of the selected second media data segment, and a byte-offset to indicate an ending of the selected second media data segment.

3. The method of claim 1, wherein the first media data segment comprises the first index portion, and the selected second media data segment comprises the second index portion.

4. The method of claim 1, wherein said selecting the second media data segment comprises:
    if an encoding bit-rate of the first data item being output for playing on the output device is less than the supportable streaming bit-rate via the communication channel then, identifying the selected second media data segment from the media data segments that comprise, respectively, the media portions succeeding the first media portion, the identified second media data segment encoded at one of the multiple bit-rates
        larger than or equal to the encoding bit-rate of the first data item being output for playing on the output device, and
        smaller than the supportable streaming bit-rate via the communication channel; and
    if the encoding bit-rate of the first data item being output for playing on the output device is larger than or equal to the supportable streaming bit-rate via the communication channel then, identifying the selected second media data segment from the media data segments that comprise, respectively, the media portions succeeding the first media portion, the identified second media data segment encoded at one of the multiple bit-rates smaller than the supportable streaming bit-rate via the communication channel.

5. The method of claim 4, wherein
the predetermined media locations
    comprise byte-offsets spaced to divide the media into parts having equal duration, and
    correspond to media portions encoded at a lowest bit-rate from multiple bit-rates, and
the selecting of the second media data segment comprises
    identifying the selected second media data segment from the media data segments that correspond, respectively, to the predetermined media locations of the media document.

6. The method of claim 5, wherein the identified second media data segment succeeds the received first media data segment.

7. The method of claim 5, wherein the identified second media data segment precedes the received first media data segment.

8. A non-transitory computer storage medium encoded with a computer program, the program comprising instructions that when executed by data processing apparatus cause the data processing apparatus to perform operations comprising:
receiving, from a media streaming provider via a communication channel in response to a first request, a first segment of a media document, the received first segment comprising:

a first media portion of the media document, and
a first portion of an index for the media document, the first index portion comprising index information relating to a first set of segments, the first set of segments comprising
segments of the media document that comprise, respectively, media portions succeeding the first media portion, each of the media portions succeeding the first media portion being encoded at each of multiple bit-rates, and
segments of the media document that correspond, respectively, to predetermined media locations of the media document, each of the segments that correspond to the predetermined media locations including an associated media portion encoded at a lowest bit-rate from the multiple bit-rates;
while the received first segment is being output for playing on an output device, selecting a second segment from the first set of segments of the media document based on:
the information in the first index portion, and
a supportable streaming bit-rate via the communication channel;
requesting, in a second request different from the first request, the selected second segment of the media document from the media streaming provider; and
receiving, from the media streaming provider via the communication channel in response to the second request, the selected second segment of the media document, the received selected second segment comprising:
a second media portion of the media document, and
a second portion of the index for the media document that is different from the first index portion, the second index portion comprising index information relating to a second set of segments, the second set of segments comprising
segments of the media document that comprise, respectively, media portions succeeding the second media portion, each of the media portions succeeding the second media portion being encoded at each of the multiple bit-rates, and
segments of the media document that correspond, respectively, to the predetermined media locations of the media document, each of the segments that correspond to the predetermined media locations including the associated media portion encoded at the lowest bit-rate from the multiple bit-rates.

9. The non-transitory computer storage medium of claim 8, wherein the request for the selected second segment of the media document via the communication channel includes operations comprising:
specifying a locator of the media document, a byte-offset to indicate a beginning of the selected second segment, and a byte-offset to indicate an ending of the selected second segment.

10. The non-transitory computer storage medium of claim 8, wherein said selecting the second segment comprises:
if an encoding bit-rate of the first segment being output for playing on the output device is less than the supportable streaming bit-rate via the communication channel then, identifying the selected second segment from among the segments of the media document that comprise, respectively, the media portions succeeding the first media portion, the identified second segment encoded at one of the multiple bit-rates
larger than or equal to the encoding bit-rate of the first segment being output for playing on the output device, and
smaller than the supportable streaming bit-rate via the communication channel; and
if the encoding bit-rate of the first segment being output for playing on the output device is larger than or equal to the supportable streaming bit-rate via the communication channel then, identifying the selected second segment from the segments of the media document that comprise, respectively, the media portions succeeding the first media portion, the identified second segment encoded at one of the multiple bit-rates smaller than the supportable streaming bit-rate via the communication channel.

11. The non-transitory computer storage medium of claim 10, wherein
the predetermined media locations
comprise byte-offsets spaced to divide the media into parts having equal duration, and
correspond to media portions encoded at a lowest bit-rate from multiple bit-rates, and
the selecting of the second segment comprises identifying the selected second segment from the segments of the media document that correspond, respectively, to the predetermined media locations of the media document.

12. The non-transitory computer storage medium of claim 11, wherein the identified second segment succeeds the received first segment of the media document.

13. The non-transitory computer storage medium of claim 11, wherein the identified second segment precedes the received first segment of the media document.

14. A system for streaming media to a remote media play point via a communication channel, the system comprising:
a storage device including a non-transitory computer storage medium, the storage device configured to store a media document comprising segments of the media document, wherein each one of the segments comprises:
a media portion of the media document associated with the one of the segments, wherein the media portion is encoded at a bit-rate selected from a first set of different bit-rates; and
a portion of an index for the media document that is different from index portions associated with other ones of the segments, the index portion comprising index information relating to
a first set of segments of the media document that comprise, respectively, media portions succeeding the media portion associated with the one of the segments, each succeeding media portion from the first set encoded at each of the bit-rates from the set of different bit-rates, and
a second set of segments of the media document that correspond, respectively, to predetermined media locations of the media document, each segment from the second set including an associated media portion encoded at a lowest bit-rate from the set of different bit-rates,
wherein the index information comprises byte-offsets corresponding to the segments from the first and second sets;
a processor communicatively coupled to the storage device, the processor configured to:
receive, from the remote media play point, different requests for segments of the media document, each one of the requests comprising a locator of the media document, a byte-offset to indicate a beginning of the requested segment, and a byte-offset to indicate an ending of the requested segment; and
provide the requested segments of the media document to the remote media play point, such that each of the requested segments is provided in response to an associated request, prior to receiving a subsequent request for another segment.

15. The system of claim 14, wherein the set of different bit-rates comprises a first bit-rate smaller than a ratio between (i) a fraction of a TCP-initial-burst payload and (ii) a network round-trip time, wherein the media portion included in the provided segment is encoded at the first bit-rate, and a combination of the fraction of the TCP-initial-burst payload and the first bit-rate is selected based on media content to enable uninterrupted playback between consecutive requests at the remote media play point.

16. The system of claim 14, wherein each media portion of the media document is encoded at each of the bit-rates from the set of different bit-rates in a quantity of segments of the media document corresponding to the set of different bit-rates.

17. The system of claim 16, wherein the quantity of segments of the media document that comprise the media portion encoded at each of the bit-rates from the set of different bit-rates, respectively, are interleaved in a file.

18. The system of claim 16, wherein the quantity of segments of the media document that comprise the media portion encoded at each of the bit-rates from the set of different bit-rates, respectively, are stored in files corresponding to a quantity of the set of different bit-rates, respectively.

19. The system of claim 14, wherein the predetermined media locations are associated with publisher switch points.

20. The system of claim 14, wherein:

the predetermined media locations comprise byte-offsets spaced to divide the media into parts having equal duration;

the byte-offsets corresponding to segments of the second set of segments included in an index portion associated with a first segment of the media document have the largest spacing; and the spacing between the byte-offsets corresponding to the segments of the second set of segments is reduced incrementally in subsequent segments before reaching a smallest spacing equal to a duration of the media portion included in each segment.

21. The system of claim 14, wherein the predetermined media locations of the media document are selectively associated with preceding segments of the media document.

22. The system in claim 14, wherein the index portion associated with the one of the segments of the media document comprises (i) a predetermined byte-offset and (ii) a predetermined byte-range within the one of the segments of the media document.

* * * * *

UNITED STATES PATENT AND TRADEMARK OFFICE
CERTIFICATE OF CORRECTION

| | | |
|---|---|---|
| PATENT NO. | : 8,205,004 B1 | Page 1 of 1 |
| APPLICATION NO. | : 12/493121 | |
| DATED | : June 19, 2012 | |
| INVENTOR(S) | : Matthew Kaufman et al. | |

It is certified that error appears in the above-identified patent and that said Letters Patent is hereby corrected as shown below:

Column 18, line 35, after "from a", delete "first".

Signed and Sealed this
Fourteenth Day of August, 2012

David J. Kappos
*Director of the United States Patent and Trademark Office*